(12) United States Patent
Dejoris et al.

(10) Patent No.: US 7,972,105 B2
(45) Date of Patent: Jul. 5, 2011

(54) TURBINE ANTI-ROTATING STALL SCHEDULE

(75) Inventors: Timothy Dejoris, Mauldin, SC (US); Michael J. Dutka, Simpsonville, SC (US); Nick Martin, Simpsonville, SC (US); Steven M. Schirle, Anderson, SC (US)

(73) Assignee: General Electric Company, Schenectady, NY (US)

( * ) Notice: Subject to any disclaimer, the term of this patent is extended or adjusted under 35 U.S.C. 154(b) by 1090 days.

(21) Appl. No.: 11/746,860

(22) Filed: May 10, 2007

(65) Prior Publication Data

US 2008/0279676 A1     Nov. 13, 2008

(51) Int. Cl.
*F01D 17/16* (2006.01)
*F01D 17/00* (2006.01)
*F01D 19/00* (2006.01)
*F01D 21/00* (2006.01)

(52) U.S. Cl. ............ 415/1; 415/119; 415/145; 415/160; 415/162; 60/772; 60/779; 60/782; 60/795

(58) Field of Classification Search .............. 415/1, 10, 415/28–29, 36–40, 42, 119, 145, 149.1, 149.2, 415/149.4, 151, 159–162; 60/772, 779, 782, 795

See application file for complete search history.

(56) References Cited

U.S. PATENT DOCUMENTS

| | | | |
|---|---|---|---|
| 4,428,194 A | 1/1984 | Stokes et al. | |
| 4,586,870 A * | 5/1986 | Hohlweg et al. | 415/1 |
| 6,328,526 B1 | 12/2001 | Seki et al. | |
| 6,793,456 B2 * | 9/2004 | Kotani et al. | 415/1 |
| 2007/0031238 A1 | 2/2007 | Fujii et al. | |

* cited by examiner

*Primary Examiner* — Christopher Verdier
(74) *Attorney, Agent, or Firm* — Sutherland Asbill & Brennan LLP

(57) ABSTRACT

A method of starting up a turbine with a compressor have an inlet guide vane, a number of bleed valves, and a number of blades so as to limit the duration in a rotating stall window. The method may include starting rotation of the blades, increasing the speed of the rotation of the blades, closing one or more bleed valves so as to shift the rotating stall window to a higher rotational speed, partially opening the inlet guide vane to a position outside the rotating stall window, and opening the bleed valves while partially closing the inlet guide vane such that the number of blades pass through the rotating stall window.

19 Claims, 2 Drawing Sheets

TURBINE ANTI-ROTATING STALL SCHEDULE

TECHNICAL FIELD

The present application relates generally to gas turbines and more particularly relates to turbine start-up and shutdown schedules that prevent rotating stall.

BACKGROUND OF THE INVENTION

Gas turbines are designed generally to operate within a specific rotational speed and output range. Such turbines have limited variable stage geometry and limited air extractions. As a result, gas turbines often have significant off design aerodynamic conditions during start-up and shutdown operations. These conditions can result in rotating stall.

Rotating stall, as is shown schematically in FIG. 1, generally involves a number of local stall cells that may rotate at about half the rotor speed. The stall cells may provide coherent unsteady aerodynamic loads on both the rotor and the stator blades. The number and shape of the cells set up different orders of excitation or nodal diameters. The cells provide a coherent pressure wave that may align with the natural frequencies of the blades and may result in resonance. The resonance can produce very high accompanying vibratory stresses. Such rotating stall induced resonances have proven to be very high vibratory stress events.

Such vibratory resonance on the rotor and stator blades may lead to increase sensitivity to normal blade damage and therefore may result in premature failures. Rotating stall induced stresses also may be high enough to initiate a crack on a blade. Such cracks inevitably will propagate and lead to blade failure. Significant compressor damage also may occur as well as un-scheduled turbine downtime, repair costs, and reduce customer satisfaction.

There is a desire, therefore, for improved gas turbine start-up and shutdown procedures that may avoid or eliminate most rotating stall conditions. Such procedures should be easy to implement on existing equipment without extensive modifications.

SUMMARY OF THE INVENTION

The present application thus provides a method of starting up a turbine with a compressor have an inlet guide vane, a number of bleed valves, and a number of blades so as to limit the duration in a rotating stall window. The method may include starting rotation of the blades, increasing the speed of the rotation of the blades, closing one or more bleed valves so as to shift the rotating stall window to a higher rotational speed, partially opening the inlet guide vane to a position outside the rotating stall window, and opening the bleed valves while partially closing the inlet guide vane such that the number of blades pass through the rotating stall window.

The bleed valves may be closed at about 50 percent of an intended operating speed of the number of blades. A further number of bleed valves are closed at about 60 percent of the intended operating speed. The inlet guide vane is positioned originally at about 26 degrees. The inlet guide vane is modulated from about 26 degrees at about 69 percent of the intended operating speed to about 30 degrees at about 74 percent of the intended operating speed. The inlet guide vane is then modulated from about 30 degrees to about 23 degrees at about 74 percent of the intended operating speed. All of the bleed valves are opened at about 74 percent of the intended operating speed.

The step of opening the bleed valves while partially closing the inlet guide vane such that the number of blades passes through the rotating stall window lasts about one (1) second. The method further may include opening the inlet guide vane at about 84 percent of the intended operating speed. The application further describes a method of shutting down a turbine with a compressor have an inlet guide vane, a number of bleed valves, and a number of blades so as to limit the duration in a rotating stall window by reversing the steps described above.

The application further describes a method of starting up a turbine with a compressor have an inlet guide vane, a number of bleed valves, and a number of blades so as to limit the duration in a rotating stall window. The method may include starting rotation of the number of blades, increasing the speed of the rotation of the blades, closing one or more bleed valves so as to shift the rotating stall window to a higher rotational speed, and modulating the inlet guide vane such that the blades pass through the rotating stall window.

The step of closing the bleed valves so as to shift the rotating stall window to a higher rotational speed may include shifting the rotating stall window beyond a synchronous rotating stall range. The method further may include opening the bleed valves while modulating the inlet guide vane such that the blades pass through the rotating stall window. The step of modulating the inlet guide vane such that the blades pass through the rotating stall window lasts about one (1) second.

The bleed valves are closed from about 50 percent to about 74 percent of an intended operating speed of the number of blades. The inlet guide vane is positioned at about 26 degrees until about 69 percent of an intended operating speed. The inlet guide vane is modulated to about 30 degrees from about 69 percent to about 74 percent of the intended operating speed. The inlet guide vane is modulated to about 23 degrees at about 74 percent of the intended operating speed. The method further may include opening the inlet guide vane at about 84 percent of an intended operating speed. The application further describes a method of shutting down a turbine with a compressor have an inlet guide vane, a number of bleed valves, and a number of blades so as to limit the duration in a rotating stall window by reversing the steps described above.

These and other features of the present application will become apparent to one of ordinary skill in the art upon review of the following detailed description when taken into conjunction with the several drawings and the appended claims.

DETAILED DESCRIPTION

Figure 1:
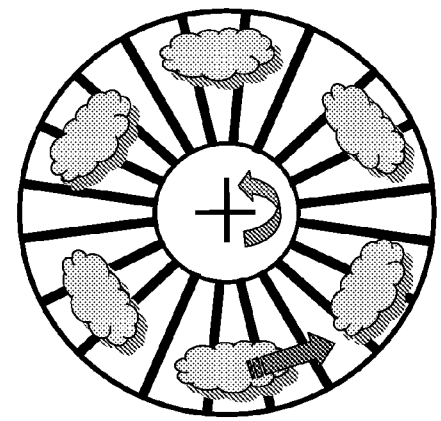
FIG. 1 is a schematic view of rotating stall cells.
Figure 2:
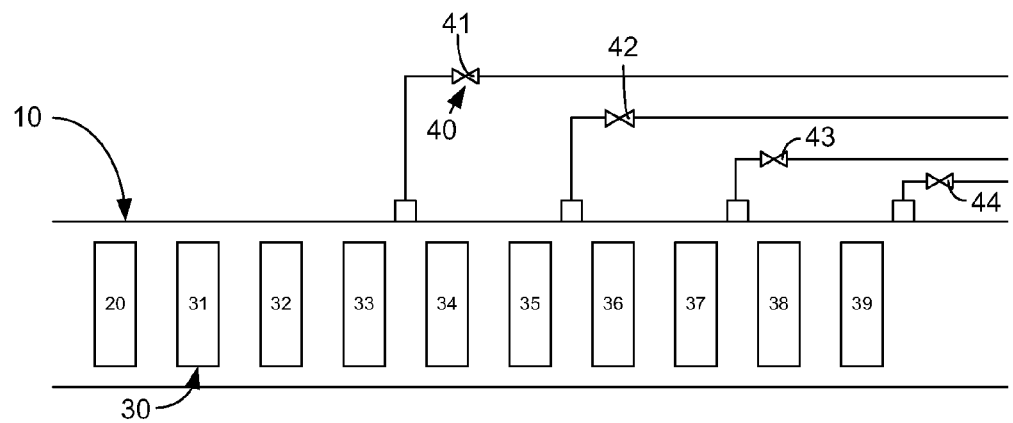
FIG. 2 is a schematic view of a compressor as may be used herein.

Referring now to the drawings, in which like numerals refer to like elements throughout the several views, FIG. 2 is a schematic view of a compressor 10. The compressor 10 includes an inlet guide vane ("IGV") 20 at an inlet end. The compressor 10 then has a variable number of rotor and stator blades 30. In this example, nine pairs of blades, 31, 32, 33, 34, 35, 36, 37, 38, 39 are shown. Any number of blades 30 may be used herein. A number of bleed valves 40 may be positioned about the blades 30. In this example, four bleed valves, 41, 42, 43, 44 are shown. Any number of bleed valves 40 may be used. In this example, the bleed valves 40 are positioned after the third pair 33, the fifth pair 35, the seventh pair 37, and the ninth pair 39. Other positions and other compressor configurations may be used herein.

Figure 3:
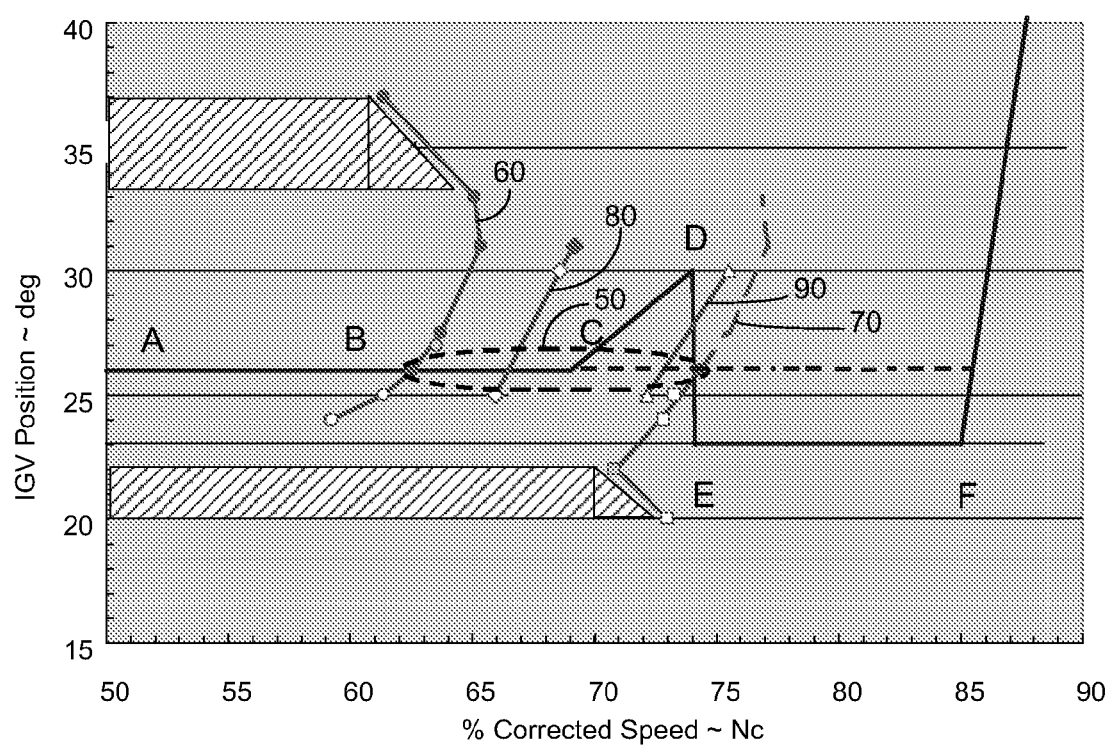
FIG. 3 is a chart showing one example of the start-up and shutdown methods described herein.

Referring now to FIG. 3, the current control logic is shown in part as a dotted line. In this example, the inlet guide vane 20 is held at about a constant 26 degrees until the compressor 10 reaches about 85 percent of the intended operating speed. At that point, the inlet guide vane 20 begins to open. In this example, all of the bleed valves 40 are open throughout. A rotating stall "window" 50 is defined as the corrected speed range from rotating stall initiation to rotating stall clearing. Specifically, the window extends from an initiation boundary 60 until a clearing boundary 70. The window 50 in this example is about one minute in duration. Such a window 50 provides ample time for rotating stall to organize into coherent pressure waves. The probability of blade resonance is directly related to the speed range or duration of the rotating stall window 50. The wider the rotating stall window 50, the higher the probability resonance and stress.

The current logic focuses on altering the position of the inlet guide vane 20 and the position of the bleed valves 40. The bleed valves 40 may be closed at a fraction of the intended operating speed of the blades 30. The bleed valves 40 may all be closed at a given speed, or staggered with speed, depending on the speed/surge capability of the compressor 10. As turbine start-up is initiated, the inlet guide vane is positioned at its typical start-up position. At a speed just below the nominal rotating stall window initiation speed, the inlet guide vane 20 may be modulated open. The specific degree of inlet guide vane modulation is set by the rotating stall initiation boundary as defined during compressor mapping. One preference is to open the inlet guide vane 20 as far as permitted to extend the rotating stall initiation to a higher speed while maintaining an adequate surge margin. Typically, a point is reached where the rotating stall imitation begins to reduce in speed or the surge margin is not adequate so as to indicate an upper bound on inlet guide vane modulation. The inlet guide vane is then modulated from this open position to a more closed position (again determined from compressor mapping). This closed position represents a position of the inlet guide vane 20 that yields the lowest rotating stall clearing speed with all of the bleed valves 40 open. All of the bleed valves 40 may be opened simultaneously as the inlet guide vane 20 is modulated closed at approximately the same speed at which the inlet guide vane 20 is modulated closed.

Specifically, one example focuses on using the lowest inlet guide vane 20 angle capability with the maximum start bleed valve 40 capacity so as to avoid as much of the window 50 as may be possible while also avoiding synchronous rotating stall. Synchronous rotating stall may occur at an inlet guide vane 20 position of over about 33 degrees until the blades 30 reach about 64 percent of the intended operating speed to about 37 degrees until the blades 30 reach about 61 percent of the intended operating speed and also at an inlet guide vane 20 position of 22 degrees until about 70 percent of the intended operating speed up down to about 20 degrees at about 72 percent of the intended operating speed. The synchronous rotating stall range is largely compressor family specific. Other ranges may be encountered.

At start up step A, two bleed valves 41, 42 are closed once the blades 30 reach about 50 percent of the intended operating speed. The inlet guide vane 20 remains at about a constant 26 degrees. The rotating stall initiation boundary 60 thus moves to an intermediate position 80 and shifts the window 50 to a higher speed. The shift also limits the range of the inlet guide vane 20 angle as well as avoids the upper range of synchronous rotating stall.

At step B, the two remaining bleed valves 43, 44 are closed at about 60 percent of the intended operating speed of the blades 30. The position of the inlet guide vane 20 again remains constant at about 26 degrees. The rotating stall initiation boundary 60 thus moves from the position 80 to a position 90 so as to shift the window 50 to an even higher operating speed and a narrower inlet guide vane position range.

At step C, the inlet guide vane 20 is modulated open such that the position increases from about 26 percent at about 69 percent of the intended operating speed to about 30 degrees at about 74 percent of the intended operating speed. As is shown, the angle of the inlet guide vane 20 is now above the stall window 50.

At step D, all of the bleed valves 40 are opened simultaneously at about 74 percent of the intended operating speed. The inlet guide vane 20 is modulated from about 30 degrees down to about 23 degrees. At this speed, the lower range of synchronous rotating stall is avoided. These actions, however, do push the operating conditions into the shifted rotating stall window 50 for a brief period. Specifically, the rotating stall window 50 is traversed in approximately one second, i.e., from step D to step E, or less than 10% of the time or speed range as compared to nominal start-up scheduling.

This brief time period significantly reduces the impact of the rotating stall window 50 so as to provide reduced probability of blade resonances and associated stress. Although the width of the stall window 50 remains the same, the strength of the pressure waves and the associated resonance is reduced by the brief time period the blades 30 are within the window 50.

At step E, the inlet guide vane 20 reaches about 23 degrees at about 74.1% of the intended operating speed. All of the bleed valves 40 are open. This point is beyond the rotating stall clearing boundary 70 at the position 90.

At step F, the inlet guide vane 20 begins to open at about 85 percent of intended operating speed as per typical startup scheduling. The rotating stall window 50 is now passed. The compressor 10 is now safely operating as is approaches the intended operating speed.

The schedule described above is compressor family specific. Although the techniques described herein apply to almost any turbines with an inlet guide vane 20 and start bleed capacity, the specific timings and positions may vary for different types of compressors. Similar actions can be used in shutdown procedures, part speed operation, and in similar types of conditions, recognizing that the speed window and the position of the inlet guide vanes 20 may be somewhat different. Specifically, the steps may be reversed for shutdown procedures. It also may be possible in certain turbine families to avoid the window 50 through only modulation of either the inlet guide vane 20 or the bleed valves 40.

The methods and procedures described above are embodied within typical control logic. Such known control devices may be programmed with the startup and shutdown steps as is commonly known in the art.

The methods and procedures described above should improve blade durability by reducing the probability of coherent rotating stall excitations and associated vibratory stresses during start-up and shutdown. Significantly, the methods and procedures described herein can be applied to current compressor configurations and can be applied to current devices as a retrofit. The only change involved is in the current start-up and shutdown control logic.

It should be apparent that the foregoing relates only to the preferred embodiments of the present application, and that numerous modifications and changes may be made herein by one of ordinary skill in the art without departing from the general spirit and scope of the invention as defined by the following claims and the equivalents thereof.

We claim:

1. A method of starting up a turbine with a compressor have an inlet guide vane, a number of bleed valves, and a number of blades so as to limit the duration in a rotating stall window, comprising:
    starting rotation of the number of blades;
    increasing the speed of the rotation of the blades;
    closing one or more bleed valves so as to shift the rotating stall window to a higher rotational speed;
    partially opening the inlet guide vane to a position outside the rotating stall window; and
    opening one or more of the bleed valves while partially closing the inlet guide vane such that the number of blades passes through the rotating stall window.

2. The method of claim 1, wherein a number of the bleed valves are closed at about 50 percent of an intended operating speed of the number of blades.

3. The method of claim 2, wherein a further number of bleed valves are closed at about 60 percent of the intended operating speed of the number of blades.

4. The method of claim 3, wherein the inlet guide vane is positioned at about 26 degrees.

5. The method of claim 1, wherein the inlet guide vane is modulated from about 26 degrees at about 69 percent of an intended operating speed to about 30 degrees at about 74 percent of the intended operating speed.

6. The method of claim 1, wherein the inlet guide vane is modulated from about 30 degrees to about 23 degrees at about 74 percent of the intended operating speed.

7. The method of claim 3, wherein all of the number of bleed valves are opened at about 74 percent of the intended operating speed.

8. The method of claim 1, wherein the step of opening one or more of the bleed valves while partially closing the inlet guide vane such that the number of blades passes through the rotating stall window comprises about one (1) second.

9. The method of claim 1, further comprising opening the inlet guide vane at about 84 percent of an intended operating speed.

10. The method of shutting down a turbine with the compressor have the inlet guide vane, the number of bleed valves, and the number of blades so as to limit the duration in the rotating stall window, comprising reversing the steps of claim 1.

11. A method of starting up a turbine with a compressor having an inlet guide vane, a number of bleed valves, and a number of blades so as to limit the duration in a rotating stall window, comprising:
    starting rotation of the number of blades;
    increasing the speed of the rotation of the blades;
    closing one or more bleed valves so as to shift the rotating stall window to a higher rotational speed;
    modulating the inlet guide vane; and
    opening the one or more of the bleed valves while modulating the inlet guide vane such that the number of blades passes through the rotating stall window.

12. The method of claim 11, wherein the step of closing the one or more bleed valves so as to shift the rotating stall window to a higher rotational speed comprises shifting the rotating stall window beyond a synchronous rotating stall range.

13. The method of claim 11, wherein the step of modulating the inlet guide vane such that the number of blades pass through the rotating stall window comprises about one (1) second.

14. The method of claim 11, the one or more bleed valves are closed from about 50 percent to about 74 percent of an intended operating speed of the number of blades.

15. The method of claim 11, wherein the inlet guide vane is positioned at about 26 degrees until about 69 percent of an intended operating speed.

16. The method of claim 11, wherein the inlet guide vane is modulated to about 30 degrees from about 69 percent to about 74 percent of the intended operating speed.

17. The method of claim 16, wherein the inlet guide vane is modulated to about 23 degrees at about 74 percent of the intended operating speed.

18. The method of claim 11, further comprising opening the inlet guide vane at about 84 percent of an intended operating speed.

19. The method of shutting down a turbine with the compressor have the inlet guide vane, the number of bleed valves, and the number of blades so as to limit the duration in the rotating stall window, comprising reversing the steps of claim 11.

* * * * *